US012726905B2

(12) United States Patent
Subramani et al.

(10) Patent No.: US 12,726,905 B2
(45) Date of Patent: Sep. 1, 2026

(54) SYSTEM AND METHOD FOR REDUCING POWER CONSUMPTION IN MESH ROUTER ACCESS POINT DEVICES

(71) Applicant: DISH Network Technologies India Private Limited, Bangalore (IN)

(72) Inventors: Manigandan Subramani, Karnataka (IN); Hariprasanth Mohanraj, Karnataka (IN); Ramegowda Thimmegowda, Karnataka (IN); Anandaraj Philips, Karnataka (IN)

(73) Assignee: DISH NETWORK TECHNOLOGIES INDIA PRIVATE LIMITED, Bangalore (IN)

( * ) Notice: Subject to any disclaimer, the term of this patent is extended or adjusted under 35 U.S.C. 154(b) by 927 days.

(21) Appl. No.: 17/975,312

(22) Filed: Oct. 27, 2022

(65) Prior Publication Data

US 2024/0147375 A1 May 2, 2024

(51) Int. Cl.
*H04W 52/02* (2009.01)

(52) U.S. Cl.
CPC ... *H04W 52/0245* (2013.01); *H04W 52/0219* (2013.01); *H04W 52/0258* (2013.01)

(58) Field of Classification Search
CPC ......... H04W 52/0245; H04W 52/0219; H04W 52/0258
See application file for complete search history.

(56) References Cited

U.S. PATENT DOCUMENTS 8,274,894 B2 9/2012 Kneckt et al.
8,385,967 B2 * 2/2013 Hoole ................. H04W 52/244 455/452.2
9,294,997 B1 3/2016 Shukla et al.
2006/0253736 A1 11/2006 Rudolf et al.
2008/0126619 A1 * 5/2008 Dybsetter ............. G06F 13/387 710/51
2009/0233594 A1 * 9/2009 Duschesne .......... H04W 52/243 455/423
2014/0120962 A1 * 5/2014 Merlin .................. H04W 68/02 455/466
2015/0358906 A1 * 12/2015 Chiou .................. H04W 12/06 370/311

FOREIGN PATENT DOCUMENTS

EP 2 171 929 B1 5/2018
JP 4845956 B2 12/2011
JP 5384618 B2 1/2014

* cited by examiner

*Primary Examiner* — Gbemileke J Onamuti
(74) *Attorney, Agent, or Firm* — Seed Intellectual Property Law Group LLP

(57) ABSTRACT

A method of operating a mesh router AP device includes: receiving a first signal transmitted by a client device, obtaining a first received signal strength indicator value based on the first signal transmitted by the client device, generating a first power level value based on the first received signal strength indicator value, and transmitting a first message to the client device based on the first power level value.

17 Claims, 6 Drawing Sheets

SYSTEM AND METHOD FOR REDUCING POWER CONSUMPTION IN MESH ROUTER ACCESS POINT DEVICES

BACKGROUND

Access point (AP) devices are commonly used in wireless local area networks (WLANs). For example, Wi-Fi router AP devices are commonly used to provide WLANs in homes and offices. However, a conventional Wi-Fi router AP device may not provide adequate coverage over a relatively large area, such as a relatively large home or office. Two or more Wi-Fi mesh router AP devices have been connected to provide a WLAN that can be accessed over a relatively large area. Mesh Wi-Fi router AP devices, however, can consume a large amount of power. Accordingly, there is a need to reduce power consumption in mesh Wi-Fi router access point devices, particularly in battery-operated mesh Wi-Fi router access point devices.

BRIEF SUMMARY

According to the present disclosure, power consumption in mesh router AP devices can be reduced, which can increase an amount of time during which such devices are able to operate without recharging or replacing batteries. For example, a mesh router AP device according to the present disclosure can use received signal strength indicators to determine that peer mesh router AP devices and/or client devices are relatively close to the mesh router AP device, and then reduce the amount of power used for wireless transmissions from the mesh router AP device to nearby devices. Additionally, a mesh router AP device according to the present disclosure can determine that one or more circuits (e.g., USB interface, LAN port) are inactive, and then stop supplying power to the inactive circuits.

In addition, a mesh router AP device according to the present disclosure can maintain a list of client devices that are connected to the mesh router AP device. The mesh router AP device removes each client device from the list in response to receiving from the client device a predetermined number of consecutive beacon signals having a signal strength below a threshold value, and then enter a power saving mode of operation when no client devices are connected to the mesh router AP device.

A method of operating a mesh router access point device according to the present disclosure may include receiving, by the mesh router access point device, a first signal transmitted by a client device; obtaining, by the mesh router access point device, a first received signal strength indicator value based on the first signal transmitted by the client device; obtaining, by the mesh router access point device, generating a first power level value based on the first received signal strength indicator value; and transmitting, by the mesh router access point device, a first message to the client device based on the first power level value.

The method may further include detecting, by the mesh router access point device, that a circuit is in an inactive state, the circuit consuming a first amount of power while in the inactive state; and causing, by the mesh router access point device, the circuit to consume a second amount of power that is less than the first amount of power in response to the detecting that the circuit is in the inactive state.

The method may further include determining, by the mesh router access point device, that the first received signal strength indicator value is greater than a first threshold value; storing, by the mesh router access point device, an identifier of the client device in a memory device in response to the determining that the first received signal strength indicator value is greater than the first threshold value; receiving, by the mesh router access point device, a plurality of second signals consecutively transmitted by the client device; obtaining, by the mesh router access point device, a plurality of second received signal strength indicator values respectively based on the second signals transmitted by the client device; determining, by the mesh router access point device, that each of the second received signal strength indicator values is less than a second threshold value that is less than the first threshold value; deleting, by the mesh router access point device, the identifier of the client device from the memory device in response to the determining that the first received signal strength indicator value is less than the second threshold value; and controlling, by the mesh router access point device, the mesh router access point device to switch from operating in a first mode in which the mesh router access point device consumes a first amount of power to operating in a second mode in which the mesh router access point device consumes a second amount of power that is less than the first amount of power in response to the deleting the identifier of the client device from the memory device.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings.

DETAILED DESCRIPTION

The present disclosure teaches mesh routing mesh router AP devices that cooperate to provide a mesh network, which can communicate with an external network, for example, a 3rd Generation Partnership Project (3GPP) 5th generation (5G) New Radio (NR) cellular telecommunication radio access network (RAN). The mesh routing mesh router AP devices utilize a control channel, which is transmitted using Wi-Fi communications, to exchange messages that are used to discover other mesh routing mesh router AP devices and client devices attached thereto (e.g., cell phones, laptop computers, tablet computers, etc.), and to determine how to route traffic within the mesh network.

For example, a root mesh router AP device of a mesh network may exchange control messages with a plurality of other root mesh router AP devices of the mesh network. The root mesh router AP device of the mesh network may receive data for a client device, and determine a destination mesh router AP device among the other root mesh router AP devices of the mesh network to which the data for the client device is to be transmitted based on the control messages. The root mesh router AP device of the mesh network also may determine a first minimum acceptable power level to use for transmission to the destination mesh router AP device based on the control messages, and transmit the data for the client device to the destination mesh router AP device at the determined first minimum acceptable power level. The destination mesh router AP device may determine a second minimum acceptable power level to use for transmission to the client device based on a strength of a signal received from the client device, and transmit the data for the client device to the destination mesh router AP device at the determined second minimum acceptable power level. Accordingly, mesh routing access point devices according to the present disclosure can reduce power consumption compared to conventional mesh router AP devices that transmit data using only one power level.

Figure 1:
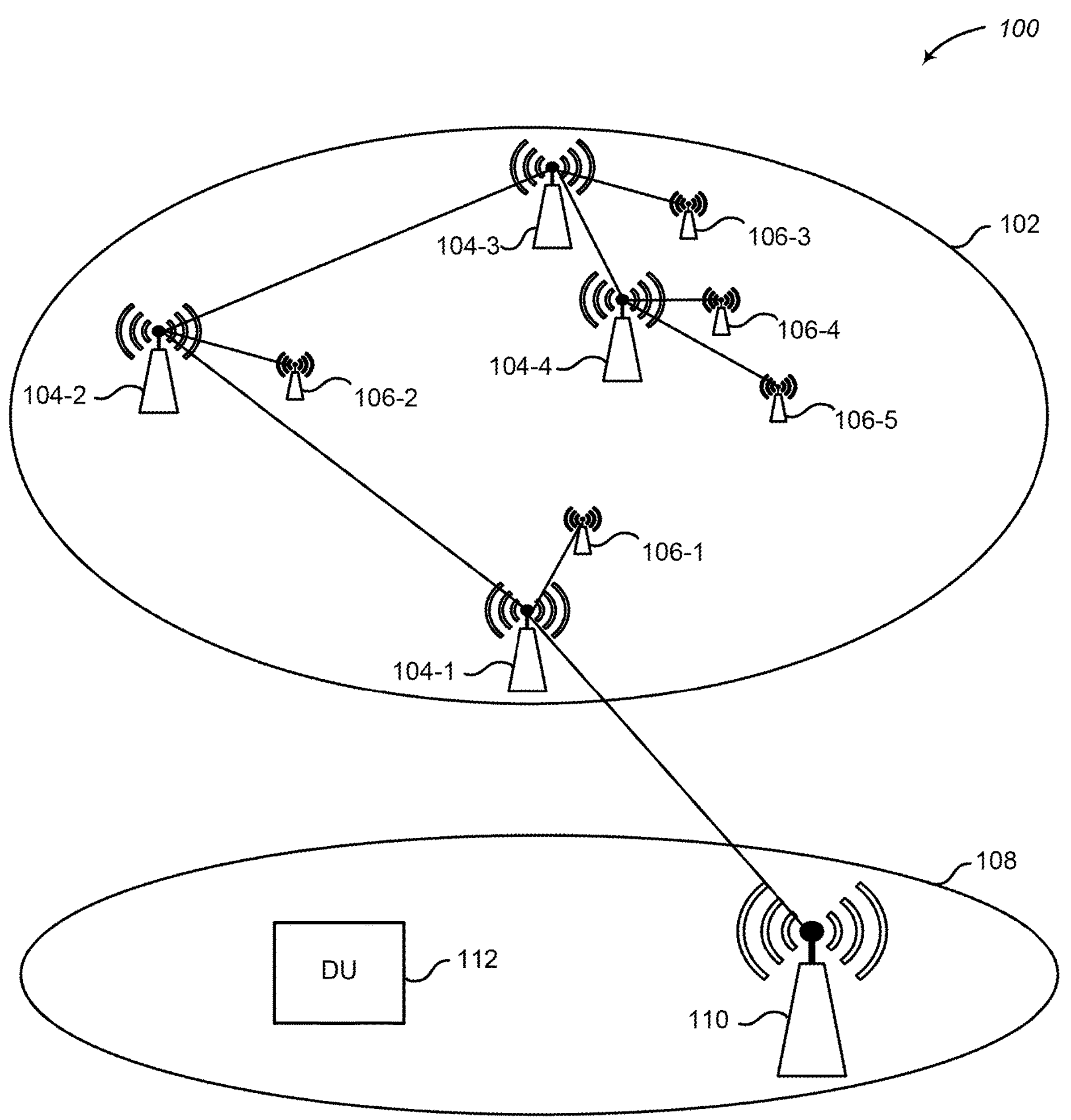
FIG. 1 is a diagram of a communication system in accordance with embodiments described herein.

FIG. 1 is a diagram of a communication system 100 in accordance with embodiments described herein. The communication system 100 includes a mesh network 102 that is provided by a plurality of mesh router AP devices 104-1, 104-2, 104-3, and 104-4.

The mesh network 102 shown in FIG. 1 also includes a plurality of client devices 106-1, 106-2, 106-3, 106-4, and 106-5. The client devices 106-1, 106-2, 106-3, 106-4, and 106-5 may be cellular telephones, laptop computers, tablet computers, etc., or a combination thereof. The mesh router AP devices 104-1, 104-2, 104-3, and 104-4 communicate with each other using one or more of the 802.11 family of standards (e.g., 802.11ac, 802.11ax, Wi-Fi, etc.) from the Institute of Electrical and Electronics Engineers (IEEE). In addition, the mesh router AP devices 104-1, 104-2, 104-3, and 104-4 communicate with the client devices 106-1, 106-2, 106-3, 106-4, and 106-5 one or more of the 802.11 family of standards (e.g., 802.11ac, 802.11ax, Wi-Fi, etc.) from the IEEE.

In the example of FIG. 1, the mesh-routing access point device 104-1 communicates directly with the mesh-routing access point device 104-2, which communicates directly with the mesh-routing access point device 104-3, which communicates directly with the mesh-routing access point device 104-4. Additionally, the mesh-routing access point device 104-1 communicates directly with the client device 106-1, the mesh-routing access point device 104-2 communicates directly with the client device 106-2, the mesh-routing access point device 104-3 communicates directly with the client device 106-3, and the mesh-routing access point device 104-4 communicates directly with the client devices 106-4 and 106-5. In addition, the mesh-routing access point device 104-1 is configured to operate as a root node of the mesh network 102, which is connected to a 3GPP 5G NR cellular telecommunication RAN 108. More particularly, the mesh-routing access point device 104-1 communicates with a Radio Unit (RU) device 110 that communicates with a Distributed Unit (DU) device 112 according to 3GPP 5G NR cellular telecommunication protocols.

In one or more implementations, each of the mesh router AP devices 104-1, 104-2, 104-3, and 104-4 is programmed to implement a version of RFC 3626 (e.g., Optimized Link State Routing (OLSR) Protocol) that is modified in accordance with the present disclosure. Using the modified version of the OLSR Protocol, each of the mesh router AP devices 104-1, 104-2, 104-3, and 104-4 periodically floods status of its links, and re-broadcasts link state information received from its neighbors. Also, each of the mesh router AP devices 104-1, 104-2, 104-3, and 104-4 keeps track of link state information received from other nodes, and uses that information to determine a next hop to each destination access point device. More particularly, the OLSR Protocol uses "Hello" messages and "Topology Control" (TC) messages to discover and disseminate link state information throughout the mesh network 102, wherein each of the mesh router AP devices 104-1, 104-2, 104-3, and 104-4 uses topology information to compute next hop destinations for all nodes in the mesh network 102 using shortest hop forwarding paths. Also, modified versions of the Open Shortest Path First (OSPF) Protocol and Intermediate System to Intermediate System (IS-IS) Protocol may be used to elect a designated access point device on every link to perform flooding of topology information. The instance of the OLSR protocol running on each of the mesh router AP devices 104-1, 104-2, 104-3, and 104-4 uses Hello messages to discover 2-hop neighbor information and perform a distributed election of a set of multipoint relay (MPR) devices, which source and forward TC messages that contain MPR selectors. Accordingly, each of the mesh router AP devices 104-1, 104-2, 104-3, and 104-4 is able to determine neighbors that are one or two hops away, and to select MPR devices that are one hop away and that offer the best routes to mesh router AP devices that are two hops away.

Using addresses (e.g., Internet Protocol (IP) addresses) included in the TC messages, each of the mesh router AP devices 104-1, 104-2, 104-3, and 104-4 maintains a routing table that is used to route data to other mesh router AP devices in the mesh network 102. Each entry in such a routing table includes, for example, an R_dest_addr field, an R_next_addr field, an R_dist field, and an R_iface_addr, wherein the node identified by the R_dest_addr field is estimated to be a number of hops identified by the R_dist field away from the local access point device, and the mesh-routing access point device with an interface address identified by the R_next_addr field is the next hop node in the route to the node identified by the R_dest_addr and is reachable through the local interface with the address identified by the R_iface_addr field.

The mesh router AP devices 104-1, 104-2, 104-3, and 104-4 may use other protocols to discover the topology of the mesh network 102. For example, each of the mesh router AP devices 104-1, 104-2, 104-3, and 104-4 may be programmed to implement a version of the Better Approach to Mobile Ad-hoc Networking (B.A.T.M.A.N.) Protocol that is modified in accordance with the present disclosure. By way of another example, each of the mesh router AP devices 104-1, 104-2, 104-3, and 104-4 may be programmed to implement a version of the Hybrid Wireless mesh Protocol (HWMP) that is modified in accordance with the present disclosure. The mesh router AP devices 104-1, 104-2, 104-3, and 104-4 may use other protocols for forming a mesh network topology and routing data within the mesh network topology without departing from the scope of the present disclosure.

In one or more implementations, the mesh router AP devices 104-1, 104-2, 104-3, and 104-4 transmit control messages that are used to determine transmission power levels. More particularly, each of the mesh router AP devices 104-1, 104-2, 104-3, and 104-4 transmit first power control messages. When each of the mesh router AP devices 104-1, 104-2, 104-3, and 104-4 receives a first power control message, it obtains a signal strength value (e.g., Signal-To-Noise Ratio (SNR) value, Signal-To-Interference-Plus-Noise Ratio (SINR) value, etc., from a receiver therein) at which the first power control message was received, and transmits a second power control message including the signal strength value to the mesh router AP device that transmitted the first power control message. When each of the mesh router AP devices 104-1, 104-2, 104-3, and 104-4 receives a first power control message, it uses the signal strength value therein to determine an appropriate transmission power level for transmitting a message to the mesh router AP device that transmitted the second power control message.

For example, the mesh router AP device 104-3 transmits a first power control message to the mesh router AP devices 104-2 and 104-4. In response, the mesh router AP device 104-2 transmits a second power control message including a relatively low strength value to the mesh router AP device 104-3, and the mesh router AP device 104-4 transmits a second power control message including a relatively low strength value to the mesh router AP device 104-3. Based on the second power control message, the mesh router AP device 104-3 transmits subsequent messages to the mesh router AP device 104-2 using a relatively high transmission power level, and transmits subsequent messages to the mesh router AP device 104-4 using a relatively low transmission power level. Accordingly, the mesh router AP device 104-3 can consume less power than a conventional mesh router AP device that transmits all messages using the same power level.

By way of another example, the mesh router AP device 104-4 receives a message (e.g., including data) from each of the client devices 106-4 and 106-5. The mesh router AP device 104-4 obtains a signal strength value (e.g., Signal-To-Noise Ratio (SNR) value, Signal-To-Interference-Plus-Noise Ratio (SINR) value, etc., from a receiver therein) at which the each message was received, wherein the signal strength value at which the message from the client device 106-4 is received is relatively high and the signal strength value at which the message from the client device 106-5 is received is relative low. Based on the respective signal strength values, the mesh router AP device 104-4 transmits subsequent messages to the client device 106-4 using a relatively low transmission power level, and transmits subsequent messages to the client device 106-5 using a relatively high transmission power level. Accordingly, the mesh router AP device 104-4 can consume less power than a conventional mesh router AP device that transmits all message using the same power level.

Figure 2:
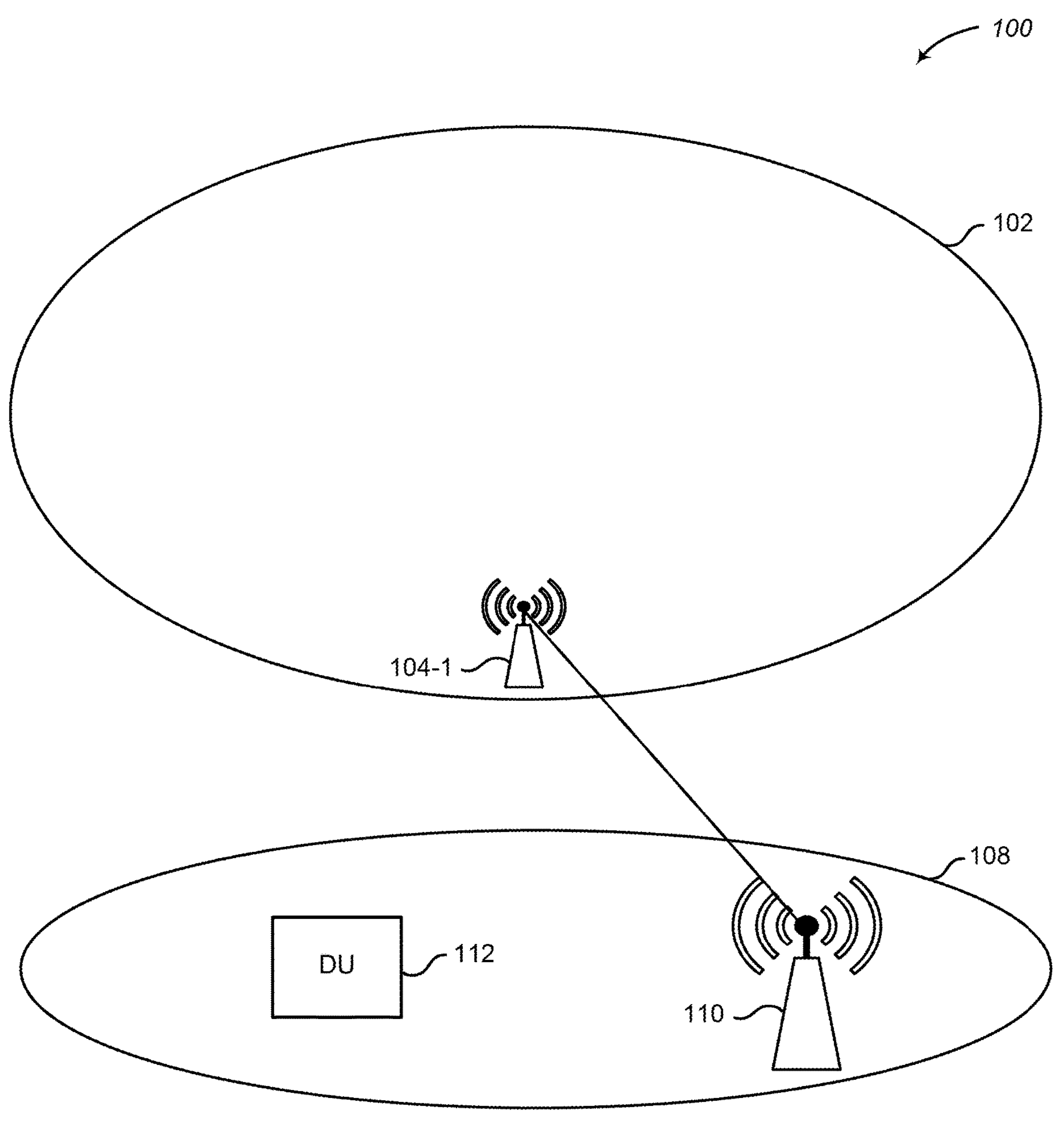
FIG. 2 is another diagram for explaining operation of a mesh router AP device in accordance with embodiments described herein.

FIG. 2 is another diagram for explaining operation of the mesh router AP device 104-1 in accordance with embodiments described herein. FIG. 2 is similar in many relevant respects to FIG. 1, except that the mesh router AP devices 104-2, 104-3, and 104-4, and the client devices 106-1, 106-2, 106-3, 106-4, and 106-5, are no longer part of the mesh network 102. For example, the mesh router AP devices 104-2, 104-3, and 104-4, and the client devices 106-1, 106-2, 106-3, 106-4, and 106-5 are mobile device that have moved sufficiently far away from the mesh router AP device 104-1 that they can no longer communicate with the mesh router AP device 104-1. Thus, the mesh router AP device 104-1 is no longer connected to any other device in the mesh network 102.

The mesh router AP device 104-1 can take one or more actions to reduce power consumption. For example, the mesh router AP device 104-1 can operate in a normal operating mode, a first power saving mode, and a second power saving mode. While operating in the normal operating mode, the mesh router AP device 104-1 consumes a first amount of power (e.g., full power). While operating in the first power saving mode, the mesh router AP device 104-1 consumes a second amount of power that is less than the first amount of power. While operating in the second power saving mode, the mesh router AP device 104-1 consumes a third amount of power that is less than the second amount of power.

More particularly, while operating in the normal operating mode, a processor of the mesh router AP device 104-1 operates continuously and power is supplied to all internal circuits and devices. While operating in the first power saving mode, the processor of the mesh router AP device 104-1 operates continuously and power is not supplied to internal circuits and devices that are determined to be inactive (e.g., local area network ports or data ports such as Universal Serial Bus (USB) ports). While operating in the second power saving mode, power is not supplied to internal circuits and devices that consume a relatively large amount of power (e.g., a transceiver including a transmitter and receiver). Also, the processor of the mesh router AP device 104-1 periodically goes to sleep for a predetermined amount of time (e.g., 2 milliseconds) and periodically wakes up to listen for signal transmitted by other devices in the mesh network 102 for a predetermined amount of time (e.g., 2 millisecond). If a signal from another device in the mesh network 102 is detected, the mesh router AP device 104-1 switches to operating in the previous operating mode (e.g., normal operating mode or first power saving mode). If a signal from another device in the mesh network 102 is not detected, the mesh router AP device 104-1 remains in the second power saving mode and its processor goes back to sleep. Accordingly, the mesh router AP device 104-4 can consume less power than a conventional mesh router AP device that does not includes such power saving modes.

Figure 3:
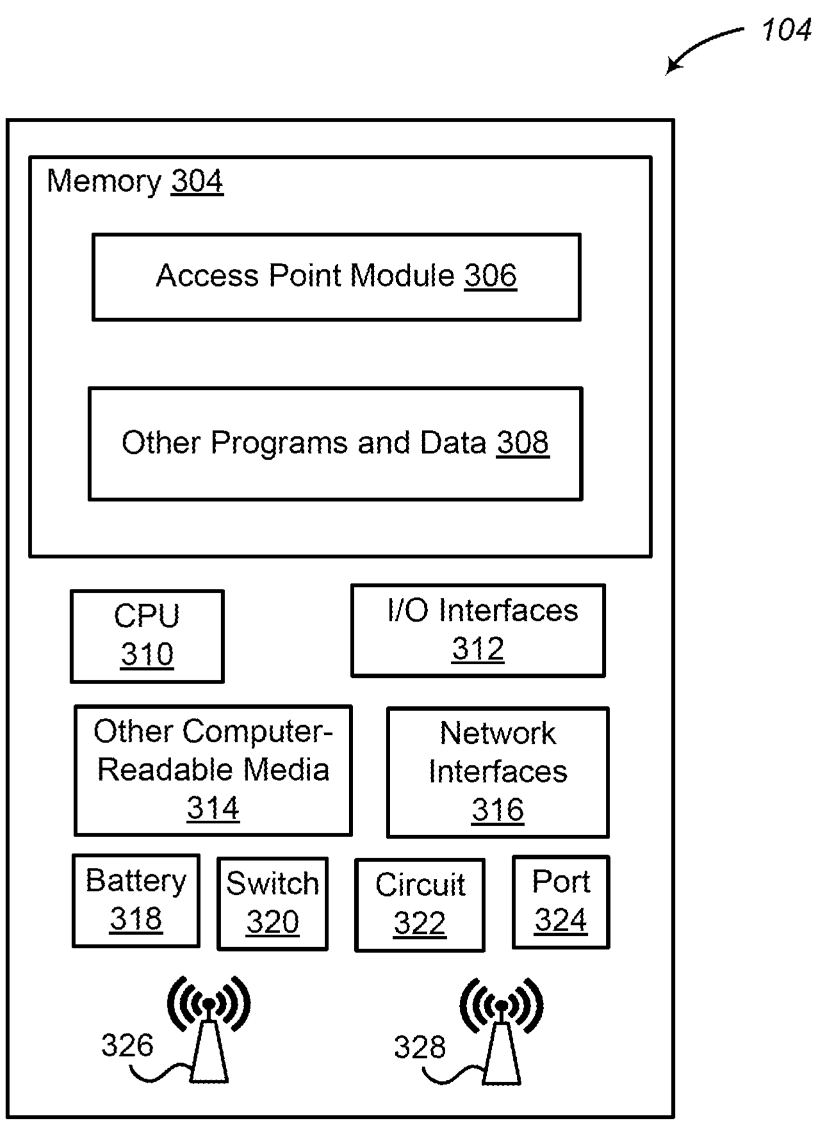
FIG. 3 is a block diagram illustrating an example of a mesh router AP device in accordance with embodiments described herein.

FIG. 3 is a block diagram illustrating an example of a mesh routing access point 104 device in accordance with embodiments described herein. In one or more embodiments, each of the mesh router AP devices 104-1, 104-2, 104-3, and 104-4 has a configuration that is similar to or the same as the mesh routing access point 104. In some embodiments, one or more special-purpose computing systems may be used to implement the mesh router AP device 104. Accordingly, various embodiments described herein may be implemented in software, hardware, firmware, or in some combination thereof. The mesh router AP device 104 may include one or more memory devices 304, one or more central processing units (CPUs) 310, I/O interfaces 312, other computer-readable media 314, network interfaces 316, a battery 318, a switch 320, a circuit 322, a port 324, a first transceiver 326, and a second transceiver 328.

The one or more memory devices 304 may include one or more various types of non-volatile and/or volatile storage technologies. Examples of the one or more memory devices 304 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 304 may be utilized to store information, including computer-readable instructions that are utilized by the one or more CPUs 310 to perform actions, including those of embodiments described herein.

The one or more memory devices 304 may have stored thereon an access point module 306. The access point module 306 is configured to implement and/or perform some or all of the functions of the mesh router AP device 104 described herein. The one or more memory devices 304 may also store other programs and data 308, which may include digital certificates, connection recovery algorithms, connection recovery rules, network protocols, O-RAN operating rules, user interfaces, operating systems, and programs for implementing the Internet Protocol (IP), Transmission Control Protocol (TCP), User Datagram Protocol (UDP), Dynamic Host Configuration Protocol (DHCP), Optimized Link State Routing (OLSR) Protocol, Open Shortest Path First (OSPF) Protocol, Intermediate System to Intermediate System (IS-IS) Protocol, etc.

I/O interfaces 312 may include a display device, a touch-screen device, buttons, knobs, dials, other data input or output interfaces, or the like. Other computer-readable media 314 may include other types of stationary or removable computer-readable media, such as removable flash drives, external hard drives, or the like. Network interfaces 316 are configured to communicate with other computing devices including Radio Unit (RU) devices, client devices, and other mesh router AP devices. In various embodiments, the network interfaces 316 include transmitters and receivers, a layer 2 (L2) switch and physical network ports to send and receive data as described herein, and to send and receive instructions, commands and data to implement the processes described herein.

In one or more embodiments, the battery 318 is a lithium ion battery. In one or more implementations, the port 324 is a local area network (LAN) port that is configured to receive a connector of an Ethernet cable or a data port that is configured to receive a connector of a USB cable. The circuit 322 is electrically coupled to various interfaces (e.g., pins) of the port 324 and controls power levels thereof for transmitting to and receiving data from the connector that is plugged into the port 324. The switch 320 is electrically coupled between the battery 318 and the circuit 322. In addition, the switch 320 is electrically coupled to the one or more CPUs 310. The one or more CPUs 310 provide one or more control signals to the switch 320 that cause the switch 320 to be in either a conductive state or a nonconductive state. While the switch 320 is in the conductive state, the battery 318 provides power to the circuit 322 via the switch 320. While the switch 320 is in the nonconductive state, the battery 318 does not provide power to the circuit 322 via the switch 320.

The transceiver 326 includes one or more transmitters and one or more receivers respectively configured to wirelessly transmit and receive radio frequency (RF) signals in accordance with one or more of the 3GPP communication standards (e.g., for 3G, 4G, LTE, and 5G communications). The transceiver 328 includes one or more transmitters transmitter and one or more transmitters receiver respectively configured to wirelessly transmit and receive RF signals in accordance with one or more of the IEEE 802.11 communication standards (e.g., 802. 11, 802.11a, 802.11, 802.11g, 802.11n, 802.11ac, 802.11ax, 802.11be).

Figure 4:
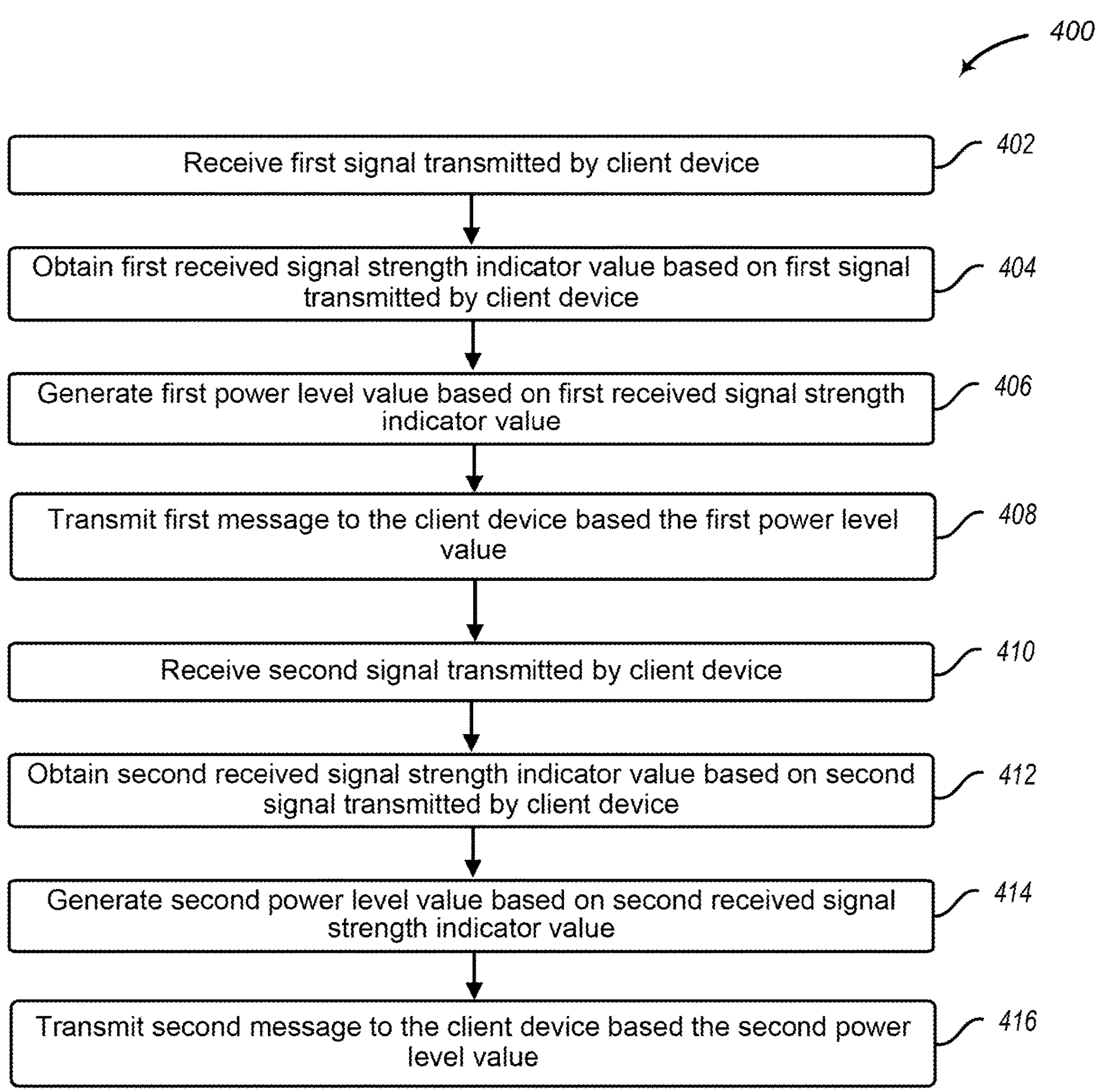
FIG. 4 illustrates a logical flow diagram showing an example of a method of operating a mesh router AP device in accordance with embodiments described herein.

FIG. 4 illustrates a logical flow diagram showing an example of a method 400 of operating a mesh router AP device in accordance with embodiments described herein. The method 400 begins at 402.

At 402, the mesh router AP device receives a first signal transmitted by a client device. For example, at 402, the mesh router AP device 104-1 shown in FIG. 1 receives a first signal transmitted by the client device 106-1. The method 400 then proceeds to 404.

At 404, the mesh router AP device obtains a first received signal strength indicator value based on the first signal transmitted by the client device. For example, at 404, the mesh router AP device 104-1 obtains a first received signal strength indicator value from the receiver of the transceiver 328 based on the first signal transmitted by the client device 106-1. The method 400 then proceeds to 406.

At 406, the mesh router AP device generates a first power level value based on the first received signal strength indicator value obtained at 404. For example, the memory 304 of the mesh router AP device 104-1 stores a table or other suitable data structure that associates each of a plurality of ranges of received signal strength indicator value with a corresponding power level value. The first power level value can be generated a number of different ways besides the two mentioned here of the look-up table and a data structure that provides an association. At 406, the one or more CPUs 310 of the mesh router AP device 104-1 determines in which of the plurality of ranges the first received signal strength indicator value is included, and then generates or otherwise determines the corresponding power level value as the first power level value. The method 400 then proceeds to 408.

At 408, the mesh router AP device transmits a first message to the client device based the first power level value obtained at 406. For example, the one or more CPUs 310 of the mesh router AP device 104-1 sends one or more signals to the transceiver 328, which causes the transmitter of the transceiver 328 to transmit a first message to the client device 106-1 based the first power level value obtained at 406. The method 400 then proceeds to 410.

At 410, the mesh router AP device receives a second signal transmitted by a client device. For example, at 410, the mesh router AP device 104-1 shown in FIG. 1 receives a second signal transmitted by the client device 106-1. The method 400 then proceeds to 412.

At 412, the mesh router AP device obtains a second received signal strength indicator value based on the second signal transmitted by the client device. For example, at 412, the mesh router AP device 104-1 obtains a second received signal strength indicator value from the receiver of the transceiver 328 based on the second signal transmitted by the client device 106-1. The method 400 then proceeds to 414.

At 414, the mesh router AP device generates or otherwise obtains a second power level value based on the second received signal strength indicator value obtained at 412. For example, at 414, the one or more CPUs 310 of the mesh router AP device 104-1 determines in which of the plurality of ranges mentioned above the second received signal strength indicator value is included, and generates the corresponding power level value as the second power level value, which is less than the first power level value. The method 400 then proceeds to 416.

At 416, the mesh router AP device transmits a second message to the client device based the second power level value obtained at 414. For example, the one or more CPUs 310 of the mesh router AP device 104-1 sends one or more signals to the transceiver 328, which causes the transmitter of the transceiver 328 to transmit a second message to the client device 106-1 based the second power level value obtained at 414. The method 400 then ends.

Figure 5:
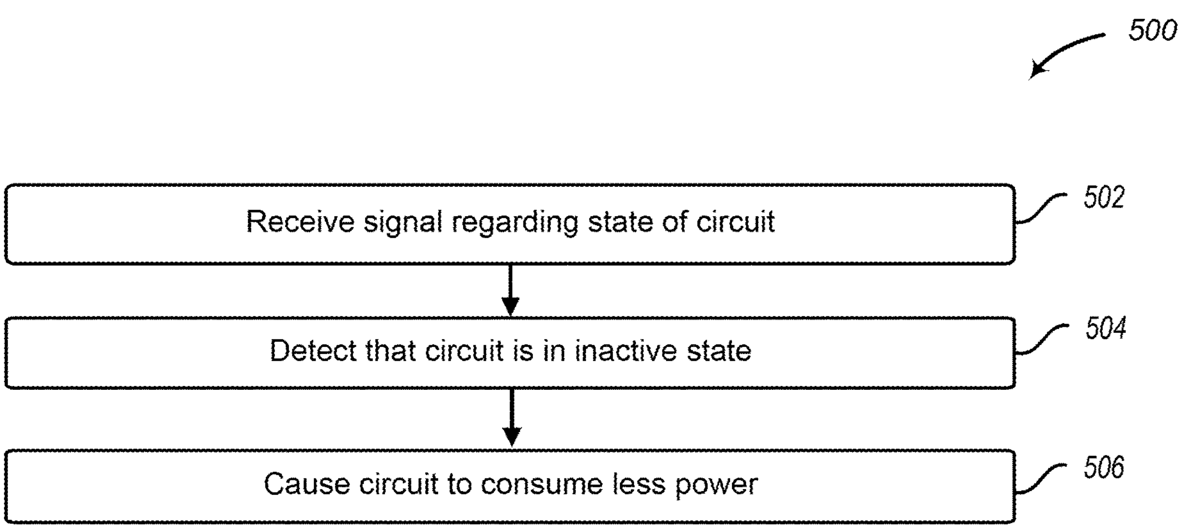
FIG. 5 illustrates a logical flow diagram showing another example of a method of operating a mesh router AP device in accordance with embodiments described herein.

FIG. 5 illustrates a logical flow diagram showing another example of a method 500 of operating a mesh router AP device in accordance with embodiments described herein. The method 500 begins at 502.

At 502, the mesh router AP device receives a signal regarding state of a circuit. For example, at 502, the mesh router AP device 104-1 shown in FIG. 1 receives a first signal from the circuit 322. If a connector is inserted in the port 324, two of the interfaces (e.g., pins) of the port 324 are short-circuited together and the first signal has a first characteristic (e.g., first voltage level) that indicates that the circuit 322 is active. If a connector is not inserted in the port 324, the two of the interfaces (e.g., pins) of the port 324 are not short-circuited together and the first signal has a second characteristic (e.g., second voltage level) that indicates that the circuit 322 is inactive. The method 500 then proceeds to 504.

At 504, the mesh router AP device detects that circuit is in inactive state. For example, at 504, the mesh router AP device 104-1 detects that the signal received at 502 has the second characteristic (e.g., second voltage level) that indicates that the circuit 322 is inactive. The method 500 then proceeds to 506.

At 506, the mesh router AP device causes the circuit to consume less power. For example, a 506, the one or more CPUs 310 of the mesh router AP device 104-1 causes a control signal that causes the switch 320 to be in the nonconductive state to be provided to the switch 320. By way of another example, the one or more CPUs 310 of the mesh router AP device 104-1 causes a control signal that causes the circuit 322 to enter a power save mode of operation (e.g., sleep mode0 to be provided to the circuit 322. The method 500 then ends.

Figure 6:
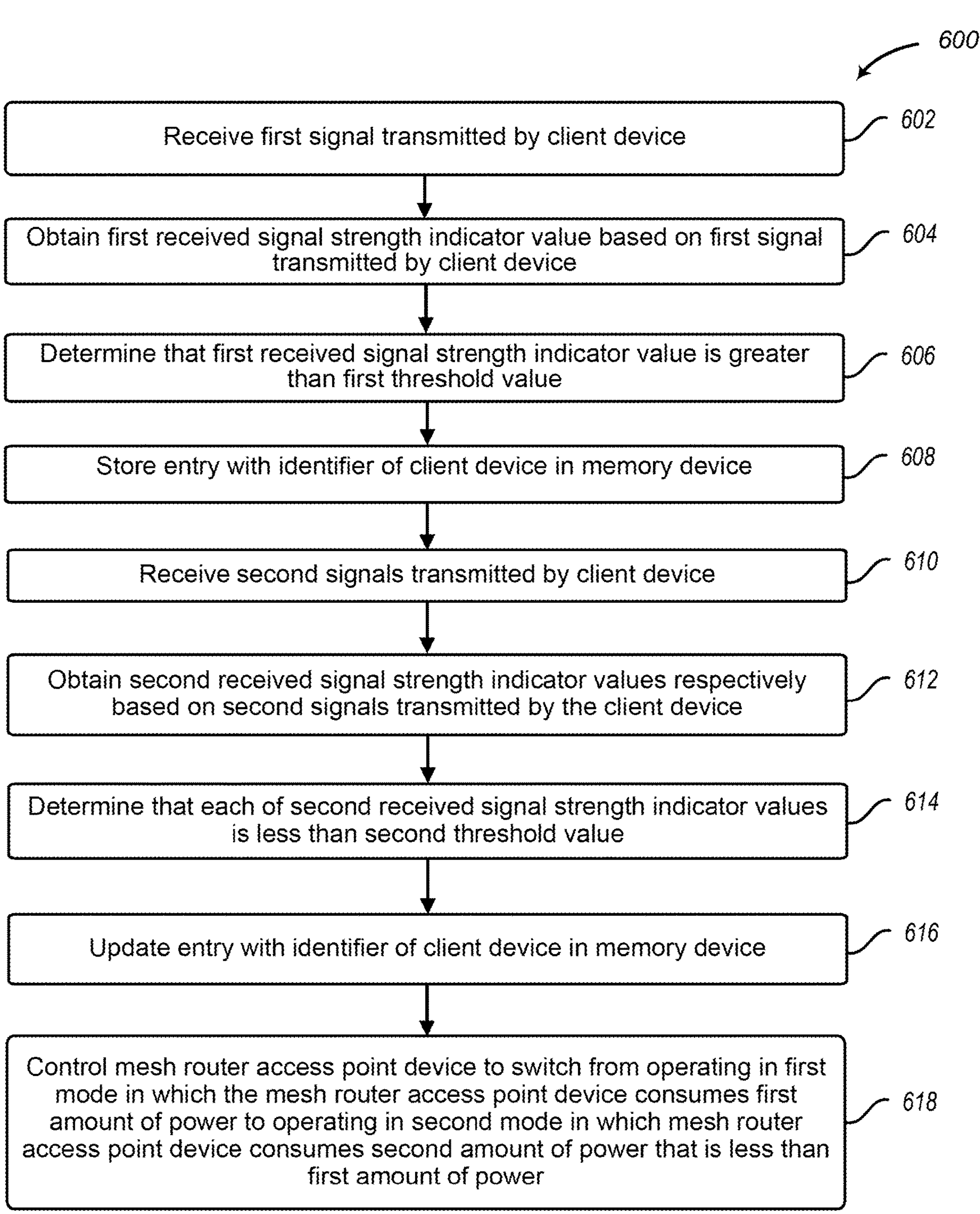
FIG. 6 illustrates a logical flow diagram showing yet another example of a method of operating a mesh router AP device in accordance with embodiments described herein.

FIG. 6 illustrates a logical flow diagram showing yet another example of a method of operating a mesh router AP device in accordance with embodiments described herein. The method 600 begins at 602.

At 602, the mesh router AP device receives a first signal transmitted by a client device. For example, at 602, the mesh router AP device 104-1 shown in FIG. 1 receives a first beacon signal transmitted by the client device 106-1. The method 600 then proceeds to 604.

At 604, the mesh router AP device obtains a first received signal strength indicator value based on the first signal transmitted by the client device. For example, at 604, the mesh router AP device 104-1 obtains a first received signal strength indicator value from the receiver of the transceiver 328 based on the first beacon signal transmitted by the client device 106-1. The method 600 then proceeds to 606.

At 606, the mesh router AP device determines that the first received signal strength indicator value obtained at 604 is greater than a first threshold value. For example, at 606, the one or more CPUs 310 of the mesh router AP device 104-1 compares the first received signal strength indicator value obtained at 604 to a first threshold value that is stored by the memory 304, and determines that the first received signal strength indicator value is greater than the first threshold value as a result of comparing those values. The method 600 then proceeds to 608.

At 608, the mesh router AP device stores an entry with an identifier of the client device in a memory device. For example, the one or more CPUs 310 of the mesh router AP device 104-1 stores an entry with an identifier (e.g., IP address, media access control (MAC) address) of the client device 106-1 in a table (or other suitable data structure) of connected devices stored by the memory 304. The method 600 then proceeds to 610.

At 610, the mesh router AP device receives one or more second signals transmitted by a client device. For example, at 610, the mesh router AP device 104-1 shown in FIG. 1 receives a plurality of second beacon signals transmitted by the client device 106-1. The method 600 then proceeds to 612.

At 612, the mesh router AP device obtains one or more second received signal strength indicator values based on the one or more second signals transmitted by the client device. For example, at 612, the mesh router AP device 104-1 obtains a plurality of second received signal strength indicator values from the receiver of the transceiver 328 based on the plurality of second beacon signals transmitted by the client device 106-1. The method 600 then proceeds to 614.

At 614, the mesh routing access point determines that each of the one or more second received signal strength indicator values obtained at 614 is less than second threshold value. For example, at 614, the one or more CPUs 310 of the mesh router AP device 104-1 compares each of the plurality of received signal strength indicator values to a second threshold value stored by the memory 304, and determines that each of the plurality of received signal strength indicator values is less than the second threshold value as a result of comparing those values. The method 600 then proceeds to 616.

At 616, the mesh router AP device updates the entry with the identifier of the client device in the memory device. For example, the one or more CPUs 310 of the mesh router AP device 104-1 deletes the entry with the identifier of the client device 106-1 in the memory 304. By way of another example, the one or more CPUs 310 of the mesh router AP device 104-1 updates the entry with the identifier of the client device 106-1 such that the identifier of the client device 106-1, which was previously associated with a first value indicating a connected state, to a second value indicating a disconnected state. The method 600 then proceeds to 618.

At 618, the mesh router AP device switches from operating in a first mode in which the mesh router AP device consumes a first amount of power to operating in a second mode in which mesh router AP device consumes a second amount of power that is less than the first amount of power based on the updating of the entry at 616. For example, in response to all entries being deleted from the table (or other suitable data structure) of connected devices stored by the memory 304, the one or more CPUs 310 generates one or more control signals that cause the mesh router AP device 104-1 to switch from operating in the normal operation mode to operating in the second power saving mode. By way of another example, in response to all entries being in the table (or other suitable data structure) of connected devices stored by the memory 304 being associated with the second value indicating the disconnected state, the one or more CPUs 310 generates one or more control signals that cause the mesh router AP device 104-1 to switch from operating in the normal operation mode to operating in the second power saving mode. The method 600 then ends.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a mesh router access point device, the method comprising:

receiving, by the mesh router access point device, a first signal transmitted by a client device;

obtaining, by the mesh router access point device, a first received signal strength indicator value based on the first signal transmitted by the client device;

generating, by the mesh router access point device, a first power level value based on the first received signal strength indicator value;

transmitting, by the mesh router access point device, a first message to the client device based on the first power level value; and detecting, by the mesh router access point device, that a circuit is consuming a first amount of power while in the inactive state;

causing, by the mesh router access point device, the circuit to consume no power or a second amount of power that is less than the first amount of power in response to the detecting that the circuit is consuming the first amount of power in the inactive state.

2. The method according to claim 1, further comprising:

receiving, by the mesh router access point device, a second signal transmitted by the client device;

obtaining, by the mesh router access point device, a second received signal strength indicator value based on the second signal transmitted by the client device;

generating, by the mesh router access point device, a second power level value based on the second received signal strength indicator value, the second power level value being different from the first power level value; and transmitting, by the mesh router access point device, a second message to the client device based on the second power level value.

3. The method according to claim 1, wherein the causing the circuit to consume no power or the second amount of power that is less than the first amount of power includes controlling a switch to be in a non-conductive state, and wherein the switch is electrically coupled between the circuit and a power source.

4. The method according to claim 1, further comprising:

determining, by the mesh router access point device, that the first received signal strength indicator value is greater than a first threshold value;

storing, by the mesh router access point device, an identifier of the client device in a memory device in response to the determining that the first received signal strength indicator value is greater than the first threshold value;

receiving, by the mesh router access point device, a plurality of second signals consecutively transmitted by the client device;

obtaining, by the mesh router access point device, a plurality of second received signal strength indicator values respectively corresponding to the second signals transmitted by the client device;

determining, by the mesh router access point device, that each of the second received signal strength indicator values is less than a second threshold value that is less than the first threshold value;

deleting, by the mesh router access point device, the identifier of the client device from the memory device in response to the determining that the first received signal strength indicator value is less than the second threshold value; and controlling, by the mesh router access point device, the mesh router access point device to switch from operating in a first mode in which the mesh router access point device consumes a first amount of power to operating in a second mode in which the mesh router access point device consumes a second amount of power that is less than the first amount of power in response to the deleting the identifier of the client device from the memory device.

5. The method according to claim 1, further comprising:

determining, by the mesh router access point device, that the first received signal strength indicator value is greater than a first threshold value;

associating, by the mesh router access point device, an indicator of a connected state with an identifier of the client device in a memory device in response to the determining that the first received signal strength indicator value is greater than the first threshold value;

receiving, by the mesh router access point device, a plurality of second signals consecutively transmitted by the client device;

obtaining, by the mesh router access point device, a plurality of second received signal strength indicator values respectively corresponding to the second signals transmitted by the client device;

determining, by the mesh router access point device, that each of the second received signal strength indicator values is less than a second threshold value that is less than the first threshold value;

associating, by the mesh router access point device, an indicator of a disconnected state with the identifier of the client device in the memory device in response to the determining that each of the second received signal strength indicator values is less than the second threshold value, the second threshold value being different from the first threshold value; and controlling, by the mesh router access point device, the mesh router access point device to switch from operating in a first mode in which the mesh router access point device consumes a first amount of power to operating in a second mode in which the mesh router access point device consumes a second amount of power that is less than the first amount of power in response to the associating the indicator of the disconnected state with the identifier of the client device in the memory device.

6. A mesh router access point device, comprising:

at least one memory that stores computer executable instructions; and at least one processor that executes the computer executable instructions to cause actions to be performed, the actions including:

receive a first signal transmitted by a client device;

obtain a first received signal strength indicator value based on the first signal transmitted by the client device;

store an identifier of the client device in response to the first received signal strength indicator value being greater than a first threshold value;

generate a first power level value based on the first received signal strength indicator value;

transmit a first message to the client device based on the first power level value;

obtain a plurality of second received signal strength indicator values respectively corresponding to a plurality of second signals consecutively transmitted by the client device;

in response to each of the plurality of second received signal strength indicator values being less than a second threshold value that is less than the first threshold value:

delete the identifier of the client device; and switch operation of the mesh router access point device from a first mode in which the mesh router access point device consumes a first amount of power to a second mode in which the mesh router access point device consumes a second amount of power that is less than the first amount of power.

7. The mesh router access point device according to claim 6, wherein the actions include:

receive a second signal transmitted by the client device;

obtain a second received signal strength indicator value based on the second signal transmitted by the client device;

generate a second power level value based on the second received signal strength indicator value, the second power level value being different from the first power level value; and transmit a second message to the client device based on the second power level value.

8. The mesh router access point device according to claim 6, wherein the actions include:

detect that a circuit is consuming an amount of power while in an inactive state; and cause the circuit to consume no power or another amount of power that is less than the amount of power in response to detecting that the circuit is in the inactive state.

9. The mesh router access point device according to claim 8, further comprising:

a power source electrically coupled to the at least one processor;

a circuit electrically coupled to the at least one processor; and a switch electrically coupled between the power source and the circuit, wherein the actions include control the switch to be in a non-conductive state to cause the circuit to consume no power or a reduced amount of power.

10. The mesh router access point device according to claim 8, further comprising:

a port electrically coupled to the circuit, wherein the actions include:

detect that the port is disconnected from an external device to detect that a circuit is in the inactive state.

11. The mesh router access point device according to claim 6, wherein the actions include:

associate an indicator of a connected state with the identifier of the client device in the at least one memory in response to determining that the first received signal strength indicator value is greater than the first threshold value.

12. A non-transitory computer-readable storage medium having processor-executable instructions stored thereon that, when executed by at least one processor, cause the at least one processor to cause actions to be performed by a mesh router access point device, the actions including:

receive a first signal transmitted by a client device;

obtain a first received signal strength indicator value based on the first signal transmitted by the client device;

associate an indicator of a connected state with an identifier of the client device in response to the first received signal strength indicator value being greater than a first threshold value;

generate a first power level value based on the first received signal strength indicator value;

transmit a first message to the client device based on the first power level value;

obtain a plurality of second received signal strength indicator values respectively corresponding to a plurality of second signals consecutively transmitted by the client device;

in response to each of the plurality of second received signal strength indicator values being less than a second threshold value that is less than the first threshold value:

associate an indicator of a disconnected state with the identifier of the client device; and switch operation of the mesh router access point device from a first mode in which the mesh router access point device consumes a first amount of power to a second mode in which the mesh router access point device consumes a second amount of power that is less than the first amount of power.

13. The storage medium according to claim 12, wherein the actions include:

receive a second signal transmitted by the client device;

obtain a second received signal strength indicator value based on the second signal transmitted by the client device;

generate a second power level value based on the second received signal strength indicator value, the second power level value being different from the first power level value; and transmit a second message to the client device based on the second power level value.

14. The storage medium according to claim 12, wherein the actions include:

detect that a circuit is consuming an amount of power while in an inactive state; and cause the circuit to consume no power or a another amount of power that is less than the amount of power in response to detecting that the circuit is in the inactive state.

15. The storage medium according to claim 14, wherein the mesh router access point device includes a power source electrically coupled to the at least one processor, a circuit electrically coupled to the at least one processor, and a switch electrically coupled between the power source and the circuit; and the actions include control the switch to be in a non-conductive state to cause the circuit to consume no power or a reduced amount of power.

16. The storage medium according to claim 15, further comprising:

a port electrically coupled to the circuit, wherein the actions include detect that the port is disconnected from an external device to detect that the circuit is in the inactive state.

17. The storage medium according to claim 12, wherein the actions include:

store the identifier of the client device in a memory device in response to determining that the first received signal strength indicator value is greater than the first threshold value.

* * * * *